Sept. 27, 1927.  
J. PICKETTS  
GAS ENGINE  
Filed Feb. 12, 1924  
1,643,584  
3 Sheets-Sheet 1

Inventor  
JAMES PICKETTS.  
By A. B. Bowman  
Attorney

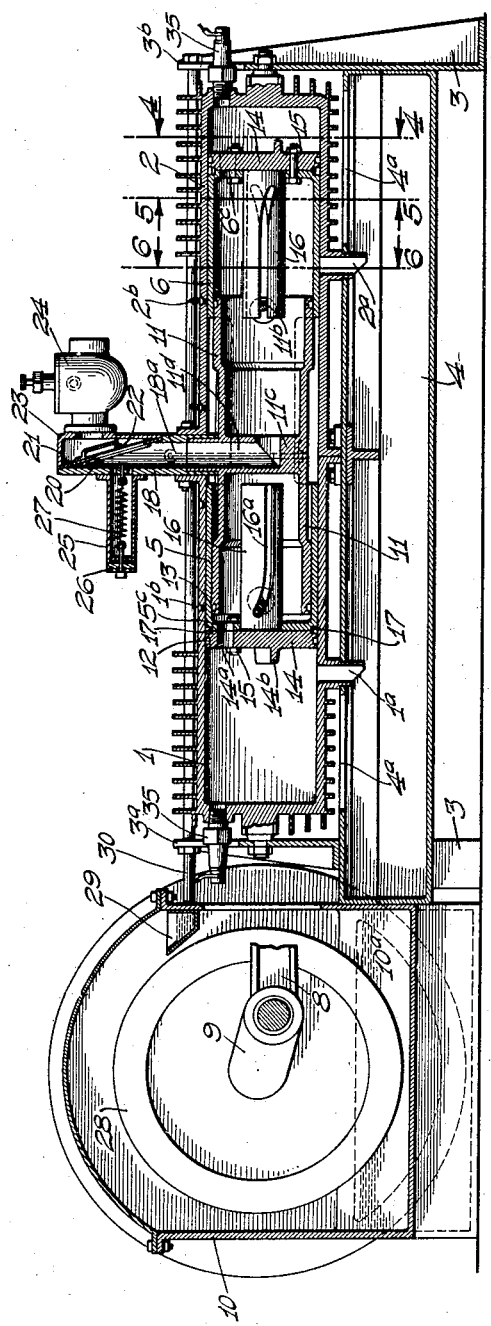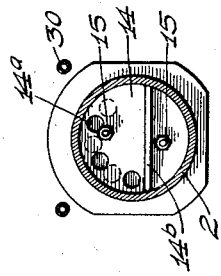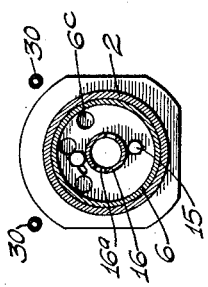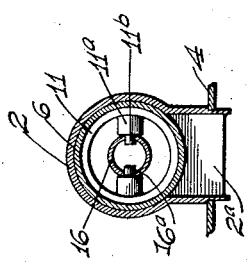

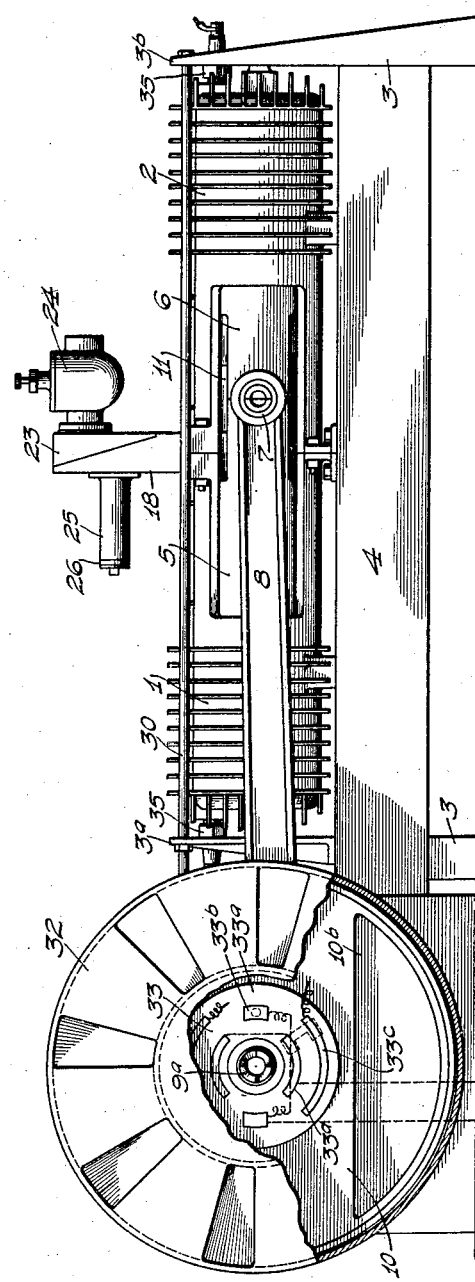

Patented Sept. 27, 1927.

1,643,584

UNITED STATES PATENT OFFICE.

JAMES PICKETTS, OF SAN DIEGO, CALIFORNIA.

GAS ENGINE.

Application filed February 12, 1924. Serial No. 692,264.

My invention relates to gas engines, and the objects of my invention are: First, to provide a gas engine in which the cylinders are positioned in opposed relation to each other and in which the pistons mounted and operating in the opposed cylinders are rigidly secured together and act as a unit; second, to provide an engine of this class in which one explosion occurs at every stroke of the unit pistons; third, to provide a novel valve mechanism for an engine of this class and a novel means for operating the same; fourth, to provide an engine of this class in which the fuel gases are compressed and slightly pre-heated before entering the combustion chamber; fifth, to provide novel means for compressing the fuel gases before the same enter the combustion chamber of the engine; sixth, to provide novel valve means intermediate the carbureter and the compression chamber of the gas engine for preventing the compressed gases from being forced back into the carbureter; seventh, to provide a safety valve mechanism in connection with an engine of this class to relieve excessive pressure in the compression chambers in case of pre-ignition; eighth, to provide a novel fan mechanism for an engine of this class for exhausting the burnt gases and which also serves as a cooling fan for the engine; ninth, to provide a novel oiling system for a gas engine of this class; tenth, to provide novel timing means for gas engines; eleventh, to provide as a whole a novelly constructed gas engine, and twelfth, to provide a gas engine which is very simple and economical of construction, durable, efficient, which may be easily assembled and disassembled, which has relatively few moving parts, and which will not readily deteriorate or get out of order.

Figure 1:
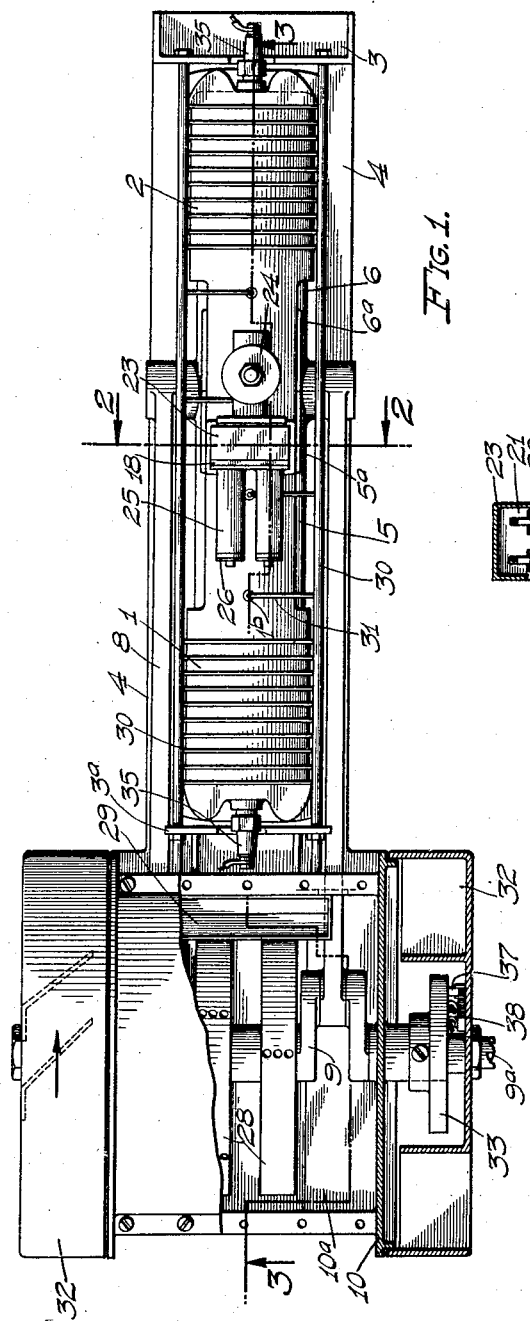
Figure 2:
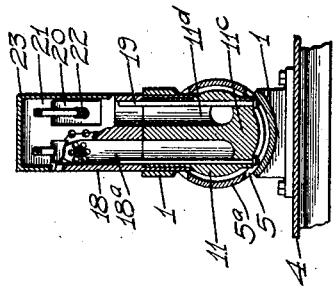

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is a plan view of my gas engine, showing certain parts and portions thereof broken away and in section to facilitate the illustration; Fig. 2 is a fragmentary sectional elevational view thereof, taken through 2—2 of Fig. 1; Fig. 3 is a longitudinal sectional elevational view thereof with the section taken through 3—3 of Fig. 1, showing certain parts and portions thereof in elevation and others broken away to facilitate the illustration; Fig. 4 is a transverse sectional view thereof, taken through 4—4 of Fig. 3; Fig. 5 is another transverse sectional view thereof, taken through 5—5 of Fig. 3; Fig. 6 is a fragmentary transverse sectional view thereof, taken through 6—6 of Fig. 3; Fig. 7 is a side elevational view of my gas engine, showing certain parts and portions of the exhausting fan broken away and in section to facilitate the illustration and showing also diagrammatically the electric wiring for the ignition system of my engine, and Fig. 8 is a partial plan and partial longitudinal sectional view of the main pistons and the inner compression piston member mounted therein.

Like characters of reference refer to similar parts and portions throughout the several views of the drawings.

The cylinders 1 and 2, frame 3, exhaust and air chamber 4, pistons 5 and 6, bushings 7, connecting rods 8, crank-shaft 9, crank-case 10, piston member 11, piston rings 12 and 13, valve members 14, bolts 15, cam members 16, sealing rings 17, valve supporting casing 18, bolts 19, valves 20, valve frame 21, springs 22, cover 23, carbureter 24, safety valve cylinders 25, valves 26, tension springs 27, fly wheels 28, oil trough 29, oil conductors 30 and 31, fan members 32, timer member 33, coil 34, spark plugs 35, battery 36, and the brushes 37 and 38, constitute the principal parts and portions of my gas engine structure.

The cylinders 1 and 2 of my gas engine are positioned in opposed relation and in alinement with each other and are supported on a frame 3, which is provided at its under portion with a chamber or duct 4. The cylinders are cut away at the sides near their inner ends, forming arms at their upper and lower portions which are secured together at their inner ends, as shown best in Figs. 1 and 7 of the drawings. Said cylinders are secured at said inner ends to the top of the chamber 4 and at the outer ends on upwardly extending portions 3$^a$ and 3$^b$ of the frame. In the cylinders 1 and 2 are reciprocally mounted respectively the pistons 5 and 6, which are provided with inwardly extending portions 5$^a$ and 6$^a$ at their sides, as shown in Fig. 2, which portions are secured together at their inner ends, said portions being provided at said inner ends with laterally outwardly extending lugs 5$^b$ and 6$^b$, Fig. 8, around which are positioned the bushings 7 which bushings are adapted to retain said pistons together as a unit. On the bushings 7 are pivotally mounted the one ends of the connecting rods 8, which are connected at their opposite ends to the crank-shaft 9 which is revolubly mounted in the crank-case 10. Said crank-case is positioned at one end of the frame 3 and is provided at its lower outer sides with chambers or ducts 10$^a$ which communicate with the exhaust and air chamber or duct 4. Within the inner ends of the pistons 5 and 6 are positioned the ends of the fuel gas compression piston member 11, over which the pistons 5 and 6 are also reciprocally mounted, the member 11 being centrally positioned between the cylinders 1 and 2 and supported by the inwardly extending arms thereof. The pistons 5 and 6 as well as the piston member 11 are provided with compression rings 12 and 13, respectively, near their ends. At the heads of the pistons 5 and 6 are rotatably mounted the disc-shaped valve members 14, which are retained in position against the respective pistons by means of bolts 15. Said valve members are provided with cam members 16, which extend inwardly into the pistons and are provided on their sides with cam grooves 16$^a$, the greater portions thereof at the inner ends of said cam members being straight and parallel with the longitudinal axes of the pistons and the portions of said cam grooves near the heads of the pistons being curved, substantially as shown in Fig. 3 of the drawings. At the inner sides of the ends of the piston member 11 are provided bosses 11$^a$, which are adapted to extend into the cam grooves 16$^a$ of the member 16 and rotate the same when in certain position, as shown best in Figs. 3 and 6 of the drawings. At the joints between the valve members 14 and the heads of the pistons are provided additional rings 17 inside of the conventional compression rings 12, which prevent fuel gases from escaping through said joints. As the pistons are shifted to their receded positions toward the center of the engine, the exhaust ports 1$^a$ and 2$^a$ on the under sides of the cylinders 1 and 2 are uncovered, permitting the exhaust gases to be discharged into the chamber or duct 4. Shortly after the exhaust ports are uncovered, the pins 11$^b$ on the bosses 11$^a$ of the member 11 are in such a position in the cam grooves 16$^a$ as to rotate the valve members 14 and aline the ports 5$^c$ and 6$^c$ in the pistons with the ports 14$^a$ in the valve members, thus permitting the fuel gases compressed within the ends of the piston member 11 to be discharged under pressure into the combustion chamber of the respective cylinders when the same are in the receded positions. The valve members 14 are also provided at the outer faces of the walls forming the heads of the pistons with baffle portions 14$^b$ to facilitate the scavenging of the burnt gases, as in the conventional two-cycle engine.

At the middle portion of the piston member 11 is provided a wall 11$^c$, which is provided with passages 11$^d$ extending from the upper end thereof to either of the compartments at the ends of the piston member 11, as shown in Figs. 2 and 3 of the drawings. At the upper end of the middle wall portion of the piston member 11 is secured the valve supporting casing 18 by means of the bolts 19. In the valve supporting casing 18 are provided a pair of passages 18$^a$ which communicate with the passages 11$^d$. At the upper end of the passages 18$^a$ are provided intake valves 20 which are pivotally mounted at their upper ends on the valve frame 21, and are retained in a closed position by means of tension springs 22. The frame 21 is retained in position over the passages 18$^a$ by means of the hollow cover 23, which supports the carbureter 24, adapted to supply the fuel to the engine.

At the one side of the valve supporting casing 18 are provided a pair of cylinders 25, which communicate with the passages 18$^a$. At the ends of said cylinders are provided valves 26, which are retained in position against the ends thereof by means of tension springs 27.

The valves 26 are provided to relieve the pressure in case pre-ignition of the fuel gases takes place between the ends of the compression piston member 11 and the other piston and is so mounted that no air is admitted when the fuel gases are drawn into the passages from the carbureter, the valves 20 being also so mounted that they will not open when an explosion occurs, as stated.

Within the crank-case 10 of the engine and mounted on the crank-shaft 9 thereof are the fly wheels 28, which in addition to their regular function are adapted to throw the oil placed in the bottom of the crank-case into the trough 29 positioned at the upper portion of and to one side of the crank-case and contiguous to the periphery of the fly wheels. To the trough 29 are connected a pair of conductors 30, which extend therefrom to the other end of the engine and perform a double function of reinforcing the engine as well as conducting the oil to various parts thereof. To the conductors 30 are connected smaller conductors 31, which extend inwardly and are adapted to discharge oil through the openings 1$^b$ and 2$^b$ at the upper portion of the cylinders 1 and 2, respectively, one of the oil openings being adapted to lubricate the reciprocating pistons of the engine and the other being adapted to lubricate the piston member 11 and other parts of the engine. It will be here noted that the piston member 11 is provided at its upper side and inner portions with wells 11ᵉ, which are adapted to supply oil to the ends of said piston member, as shown best in Fig. 8 of the drawings.

At either side of the crank-case and mounted on the ends of the crank-shaft of the engine are fan members 32, which are adapted to exhaust the air drawn through the openings 4ᵃ at the upper portions of the chamber 4 below each of the cylinders and also the burnt gases discharged into the chamber 4 from said cylinders, said chamber 4 being connected at one end with each of the chambers 10ᵃ on each side of the crank-case. The chambers 10ᵃ are provided with large openings 10ᵇ on their outer sides to permit the air and burnt gases to be exhausted therefrom. The exhaust fans are preferably made in the form of a drum, as shown in the drawings, so as to provide a smooth revolving member. It will be here noted that the large openings on the upper side of the chamber 4 are adapted to permit the drawing and circulating of cool air around the whole of the cylinders of the engine, thus providing a simple and economical cooling means.

At the one end of the crank-shaft 9 is provided a clutch portion 9ᵃ so that the engine may be readily started by hand.

Mounted at one end of the crank-case, preferably on the journal portion thereof and encased by one of the fan members 32 is the timer member 33. Said timer member is provided with an insulated disc 33ᵃ, in the face of which is mounted a pair of opposed metallic segments 33ᵇ, which are connected with each other and with the one end of the secondary winding of the coil 34. Between the segments 33ᵇ are positioned other spaced apart segments 33ᶜ and 33ᵈ, the inner segments 33ᵈ being connected together and with the other end of the secondary winding of the coil 34. The outer segments 33c are connected respectively with the spark plugs 35 mounted in the heads of the cylinders 1 and 2. The primary winding of the coil 34 is connected with a battery 36 or other source of electrical energy and is grounded with the frame of the engine. On the inside of the exhausting fan member 32, positioned over the timer member, is yieldably mounted a brush 37, which is adapted to contact with the segments 33ᵇ and ground the same, thus grounding one end of the secondary winding of the coil. Also positioned within and supported by said exhausting fan member is another brush member 38, which is insulated therefrom and is adapted to connect the spaced apart segments 33ᶜ and 33ᵈ, as shown by dotted lines in Fig. 7 of the drawings.

It will be here noted that the segments 33ᶜ and 33ᵈ are connected a considerable portion of the revolution of the exhausting fan, but no spark is produced until the grounded yieldable brush 37 engages one of the segments 33ᵇ, it being also noted that the path of travel of the brush 37 is between the segments 33ᶜ and 33ᵈ.

It is obvious from this construction, as illustrated in the drawings and disclosed in the foregoing specification, that there is provided a gas engine as aimed at and set forth in the objects of the invention, and though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent, is:

1. In a gas engine, a pair of opposed cylinders positioned in alinement with each other, a pair of pistons secured together and reciprocally mounted in said cylinders as a unit forming combustion chambers between their head ends and the head ends of said cylinders, a stationary member positioned between the cylinder portions of said cylinders and extending into the inner portions of said pistons forming fuel gas compression chambers between the ends of said stationary member and the inner ends of said pistons, valve means at the head of said pistons adapted to connect the inner portions thereof with the combustion chamber of said cylinder, and cam means in connection with said valve means extending into the interior of said pistons and operably connected with said stationary member.

2. In a gas engine, a pair of opposed cylinders positioned in alinement with each other, a pair of pistons secured together and reciprocally mounted in said cylinders as a unit, a stationary member positioned between the cylinder portions of said cylinders and extending into the inner portions of said pistons, valve means at the head of said pistons adapted to connect the inner portions thereof with the combustion chamber of said cylinder, cam means in connection with said valve means extending into the interior of said pistons and operably connected with said stationary member, and valve means separately connecting the compartments at the opposite ends of said stationary member with a source of fuel.

3. In a gas engine, a pair of opposed cylinders positioned in alinement with each other, a pair of pistons secured together and reciprocally mounted in said cylinders as a unit, a stationary member positioned between the cylinder portions of said cylinders and extending into the inner portions of said pistons, valve means at the head of said pistons adapted to connect the inner portions thereof with the combustion chamber of said cylinder, cam means in connection with said valve means extending into the interior of said pistons and operably connected with said stationary member, fuel intake valves separately connecting the compartments at the opposite ends of said stationary member with a source of fuel, and safety valves positioned in passages connecting said compartments with the atmosphere.

4. In a gas engine, a cylinder, a piston reciprocally mounted therein forming a combustion chamber between its head end and the head end of said cylinder, a stationary piston member extending into said piston and forming therewith a compression chamber for fuel gas, and a valve member shiftably mounted in the head of said piston and operatively connected with said stationary piston member.

5. In a gas engine, a cylinder, a piston reciprocally mounted therein, a stationary gas compression piston member positioned at one end of said cylinder adapted to extend into and form with the interior of said piston a gas compression chamber, and a disc-shaped valve member rotatably mounted at the head end of said piston and provided with perforations therein adapted to connect the interior of said piston with the combustion chamber of said cylinder with the rotation of said valve member.

6. In a gas engine, a cylinder, a piston reciprocally mounted therein, a stationary gas compression piston member positioned at one end of said cylinder adapted to extend into and form with the interior of said piston a gas compression chamber, a disc-shaped valve member rotatably mounted at the head end of said piston and provided with perforations therein adapted to connect the interior of said piston with the combustion chamber of said cylinder with the rotation of said valve member, a cam member secured to said valve member and extending therefrom into said piston and provided at the sides thereof with cam grooves, and guide means in connection with said stationary compression piston member adapted to extend into said cam grooves for rotating said cam member with its reciprocating movement.

7. In a gas engine, a cylinder, a piston reciprocally mounted in said cylinder, a disc-shaped valve member rotatably mounted on the outside of the head portion of said piston and provided with a plurality of perforations adapted to aline with similar perforations in the head of said piston for connecting the interior thereof with the combustion chamber of said cylinder, and a sealing ring positioned between the peripheral joint of said piston and said valve member.

8. In a gas engine, a cylinder, a piston reciprocally mounted in said cylinder, a disc-shaped valve member rotatably mounted on the outside of the head portion of said piston and provided with a plurality of perforations adapted to aline with similar perforations in the head of said piston for connecting the interior thereof with the combustion chamber of said cylinder, a sealing ring positioned between the peripheral joint of said piston and said valve member, a stationary gas compression piston member extending into the inner end of said piston, and cam means connecting said valve member with said piston member for rotating the former.

In testimony whereof, I have hereunto set my hand at San Diego, California, this 2nd day of February, 1924.

JAMES PICKETTS.